（12）United States Patent
Schadow et al.

(10) Patent No.: US 11,407,075 B2
(45) Date of Patent: Aug. 9, 2022

(54) METHOD FOR ENABLING AN ACTIVE OPERATING STATE OF A HAND-HELD POWER TOOL AS A FUNCTION OF WHETHER PROTECTIVE EQUIPMENT IS CARRIED OR WORN BY AN OPERATOR OF THE HAND-HELD POWER TOOL

(71) Applicant: Robert Bosch GmbH, Stuttgart (DE)

(72) Inventors: Joachim Schadow, Stuttgart (DE); Florian Esenwein, Leinfelden-Echterdingen (DE); Benjamin Brechter, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 438 days.

(21) Appl. No.: 16/334,452

(22) PCT Filed: Aug. 21, 2017

(86) PCT No.: PCT/EP2017/071015
§ 371 (c)(1),
(2) Date: Mar. 19, 2019

(87) PCT Pub. No.: WO2018/050396
PCT Pub. Date: Mar. 22, 2018

(65) Prior Publication Data
US 2019/0210173 A1    Jul. 11, 2019

(30) Foreign Application Priority Data
Sep. 19, 2016  (DE) .................... 10 2016 217 833.4

(51) Int. Cl.
*B25F 5/00*    (2006.01)
*B23Q 11/00*   (2006.01)
(Continued)

(52) U.S. Cl.
CPC .......... *B23Q 11/0078* (2013.01); *A41D 1/002* (2013.01); *B23Q 11/0082* (2013.01);
(Continued)

(58) Field of Classification Search
CPC ...... G05B 19/4063; G05B 2219/50206; G07C 3/08; G07C 9/38; B25F 5/00;
(Continued)

(56) References Cited

U.S. PATENT DOCUMENTS 5,796,341 A * 8/1998 Stratiotis ................... F16P 3/00
340/573.1
6,853,303 B2 * 2/2005 Chen ...................... G08B 21/24
340/573.1
(Continued)

FOREIGN PATENT DOCUMENTS

| DE | 10 2015 206 608 A1 | 4/2016 |
|----|--------------------|--------|
| EP | 1 690 648 A2       | 8/2006 |
| EP | 1 690 648 A3       | 8/2006 |

OTHER PUBLICATIONS

International Search Report corresponding to PCT Application No. PCT/EP2017/071015, dated Nov. 29, 2017 (German and English language document) (5 pages).

*Primary Examiner* — Scott A Smith
(74) *Attorney, Agent, or Firm* — Maginot, Moore & Beck LLP

(57) ABSTRACT

A method enables at least one active operating state of a hand-held power tool with at least one infrastructure unit as a function of whether protective equipment is carried and/or worn by an operator of the hand-held power tool. A mobile functional unit is integrated into the hand-held power tool. The mobile functional unit is configured to control the at least one active operating state of the hand-held power tool by (i) transmitting at least one ID of a first protective equipment element of a first piece of protective equipment
(Continued)

to a first infrastructure unit, the first infrastructure unit receiving the at least one ID of the first protective equipment element of the first piece of protective equipment, and (ii) transmitting at least a first signal from the first infrastructure unit to the mobile functional unit.

12 Claims, 2 Drawing Sheets

(51) Int. Cl.
*A41D 1/00* (2018.01)
*G08B 13/14* (2006.01)
*G05B 19/4063* (2006.01)
*G08B 21/02* (2006.01)

(52) U.S. Cl.
CPC ............ *B25F 5/00* (2013.01); *G08B 13/1427* (2013.01); *G05B 19/4063* (2013.01); *G08B 21/0213* (2013.01)

(58) Field of Classification Search
CPC .............. A41D 1/002; B23Q 11/0078; B23Q 11/0082; G08B 13/1427; G08B 21/0213
USPC ..... 173/1, 2, 217, 46, 171; 340/5.1, 5.2, 5.6, 340/5.61, 5.64, 539.11, 539.13, 572.1, 340/573.1, 572.4, 10.1; 320/112; 700/108, 160, 175; 726/2; 361/179
See application file for complete search history.

(56) References Cited

U.S. PATENT DOCUMENTS

| | | | | |
|---|---|---|---|---|
| 7,298,240 B2* | 11/2007 | Lamar | ............... | B25F 5/00 340/5.6 |
| 7,330,129 B2* | 2/2008 | Crowell | ............... | B25B 23/14 318/479 |
| 7,339,477 B2* | 3/2008 | Puzio | ............... | G08B 21/0227 340/572.1 |
| 7,613,590 B2* | 11/2009 | Brown | ............... | G16H 10/20 702/188 |
| 7,784,104 B2* | 8/2010 | Innami | ............... | B25F 5/00 726/34 |
| 8,169,298 B2* | 5/2012 | Wiesner | ............... | B25F 5/00 340/5.61 |
| 8,423,180 B1* | 4/2013 | Frederick | ............... | G07F 9/026 700/236 |
| 9,055,033 B2* | 6/2015 | Mergener | ............... | H04L 67/16 |
| 10,166,643 B2* | 1/2019 | Stock | ............... | B25F 5/006 |
| 2006/0179473 A1* | 8/2006 | Innami | ............... | B25F 5/00 726/2 |
| 2008/0018472 A1* | 1/2008 | Dasilva | ............... | F16P 3/147 340/572.4 |
| 2009/0251330 A1* | 10/2009 | Gerold | ............... | B25C 1/08 340/12.22 |
| 2011/0006894 A1* | 1/2011 | Witwer | ............... | G06Q 10/06 340/539.11 |
| 2012/0136231 A1* | 5/2012 | Markel | ............... | A41B 11/00 600/388 |
| 2013/0109375 A1* | 5/2013 | Zeiler | ............... | H04W 12/126 455/426.1 |
| 2014/0070924 A1* | 3/2014 | Wenger | ............... | B25F 5/00 340/10.1 |
| 2014/0107853 A1* | 4/2014 | Ashinghurst | ............... | B25F 5/00 700/297 |
| 2014/0158389 A1* | 6/2014 | Ito | ............... | B25F 5/00 173/46 |
| 2014/0159920 A1* | 6/2014 | Furui | ............... | G08C 17/02 340/870.07 |
| 2014/0240125 A1* | 8/2014 | Burch | ............... | G06Q 10/06 340/539.13 |
| 2014/0367134 A1* | 12/2014 | Phillips | ............... | B25B 21/00 173/176 |
| 2015/0286209 A1 | 10/2015 | Kreuzer et al. | | |
| 2017/0248272 A1* | 8/2017 | Ullrich | ............... | A41D 3/00 |

* cited by examiner

METHOD FOR ENABLING AN ACTIVE OPERATING STATE OF A HAND-HELD POWER TOOL AS A FUNCTION OF WHETHER PROTECTIVE EQUIPMENT IS CARRIED OR WORN BY AN OPERATOR OF THE HAND-HELD POWER TOOL

This application is a 35 U.S.C. § 371 National Stage Application of PCT/EP2017/071015, filed on Aug. 21, 2017, which claims the benefit of priority to Serial No. DE 10 2016 217 833.4, filed on Sep. 19, 2016 in Germany, the disclosures of which are incorporated herein by reference in their entirety.

BACKGROUND

The disclosure relates to a method for enabling an active operating state of a hand-held power tool in dependence on whether an item of protective equipment is carried or worn by an operator of the hand-held power tool.

SUMMARY

In the method according to the disclosure, enabling of at least one operating state of a hand-held power tool is effected by at least one infrastructure unit in dependence on whether an item of protective equipment is carried and/or worn by an operator of the hand-held power tool. An active operating state of the hand-held power tool is to be understood here to mean, in particular, a state in which an electromotive drive of the hand-held power tool performs work. In this state, an electrical energy drives the electromotive drive unit, in particular an electric motor.

The hand-held power tool may be a drill/driver, a power drill, a power percussion drill, a screwdriver, an impact wrench, a hammer drill, a chipping hammer, a grinder, a planer, a router, a multicutter, a sawing tool, or the like.

An infrastructure unit is to be understood here to mean, in particular, a device designed for monitoring, controlling, recording information, outputting information, or the like.

Advantageously, there is a mobile functional unit integrated on or in the hand-held power tool. The mobile functional unit advantageously controls the active operating state of the hand-held power tool. That has the advantage that the hand-held power tool is switched on only if the item of protective equipment is worn by an operator.

Advantageously, in a first method step, at least one ID of at least one first protective equipment element of a first item of protective equipment is sent to at least one infrastructure unit.

In a further method step, advantageously, a first signal is sent by the first infrastructure unit to the mobile functional unit integrated in the hand-held power tool. The hand-held power tool thus only receives the signal when the item of protective equipment is worn.

At least one second infrastructure unit receives the ID of at least one second protective equipment element of the second item of protective equipment. Preferably, the second infrastructure unit sends at least one second signal to the mobile functional unit of the hand-held power tool.

Advantageously, the first infrastructure unit and/or the second infrastructure unit calculate/calculates, from the first signal and the second signal, a path travelled by the protective equipment element of the item of protective equipment. It is also conceivable, however, that a running time or a signal strength is calculated. It is thus advantageously calculated than a distance is travelled by an operator having an item of protective equipment.

According to the disclosure, from the path travelled the item of protective equipment is assigned to an operator of the hand-held power tool.

Enabling of at least one active operating state of the hand-held power tool is advantageously effected, in dependence on whether the item of protective equipment is carried or worn by the operator of the hand-held power tool, in that a signal is sent from the infrastructure unit to the mobile functional unit, and an electrical energy supply for the hand-held power tool is activated by the mobile functional unit. The hand-held power tool is thus only switched on when the item of protective equipment is carried. This increases the safety of an operator of a hand-held power tool.

In one embodiment, the functional unit is arranged at the interface to a rechargeable battery of the hand-held power tool.

In a further embodiment, the functional unit is arranged at the interface to a mains electrical power connection of the hand-held power tool.

In a further embodiment, the functional unit is arranged in the hand-held power tool.

In a further variant of the method, advantageously, an ID of at least one first protective equipment element of a first item of protective equipment and/or an ID of at least one second protective equipment element of a second item of protective equipment is sent to at least one first infrastructure unit and/or to a second infrastructure unit. Advantageously, in addition, an ID of at least one hand-held power tool is sent the first infrastructure unit and/or second infrastructure unit. At least one first signal is sent by the first infrastructure unit and/or by the second infrastructure unit to the mobile functional unit integrated in the hand-held power tool.

Further advantages and expedient embodiments are given by the description of the figures and the drawings.

BRIEF DESCRIPTION OF THE DRAWINGS

The drawings show exemplary embodiments of the method according to the disclosure for enabling an active operating state of a hand-held power tool in dependence on whether an item of protective equipment is carried or worn by an operator of the hand-held power tool.

There are shown.

DETAILED DESCRIPTION

Figure 1:
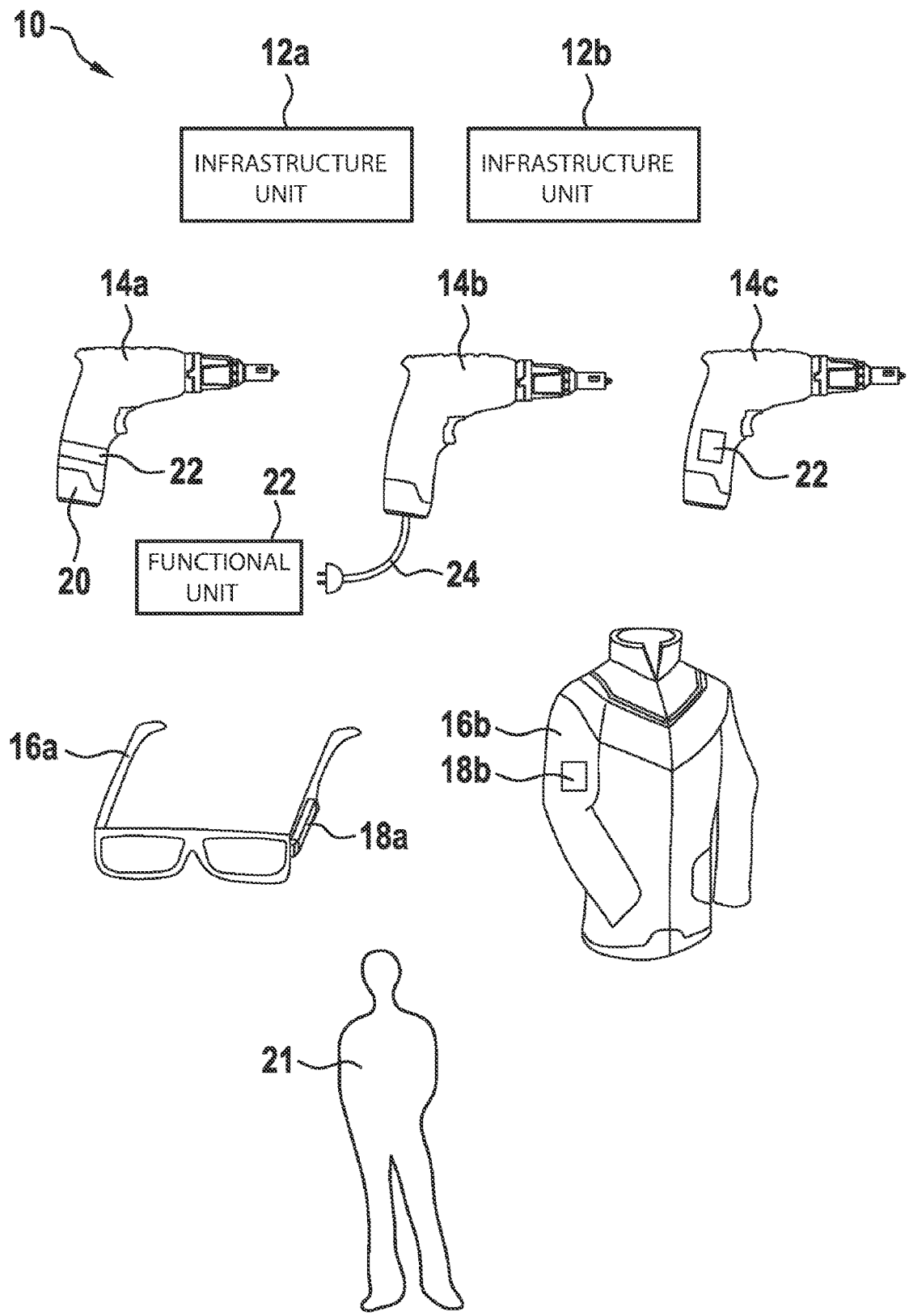
FIG. 1 a system for executing the method.

FIG. 1 shows a system comprising at least one first infrastructure unit 12a, at least one hand-held power tool 14a and at least one item of protective equipment 16a, the item of protective equipment 16a having at least one protective equipment element 18b. In the exemplary embodiment the item of protective equipment 16a is realized as safety eyewear. It is also conceivable, however, for the item of protective equipment 16a to be realized as a jacket, as trousers, as a helmet, as work shoes, as a waistcoat, as a glove or the like. In the simplest embodiment, the protective equipment element 18b has a sending unit for sending an ID, and has an energy storage unit. In the embodiment, the hand-held power tool 14a is a battery-operated hand-held power tool 14a having a rechargeable battery 20. The mobile functional unit 22 is arranged between the rechargeable battery 20 and the hand-held power tool 14a, at an interface of the hand-held power tool 14a to the rechargeable battery 20.

An operator 21 wears the item of protective equipment 16a and carries the hand-held power tool 14a. The operator 21 moves, with the item of protective equipment 16a and the hand-held power tool 14a, in a territory in which the infrastructure element 12a is located.

Furthermore, the system may include the following components, the list being non-exhaustive:
- a second infrastructure element 12b
- a second hand-held power tool 14ab
- a second item of protective equipment 16b, comprising a second protective equipment element 18b
- a multiplicity of structural elements
- a multiplicity of hand-held power tools
- a multiplicity of items of protective equipment, comprising a multiplicity of protective equipment elements The item of protective equipment 16b is realized as a jacket. It is also conceivable, however, for the item of protective equipment 16a to be realized as protective work eyewear, as trousers, as a helmet, as work shoes, as a waistcoat, as a glove or the like. In the simplest embodiment, the protective equipment element 18b has a sending unit for sending an ID, and has an energy storage unit. The hand-held power tool 14b is a mains-operated hand-held power tool 14b having a mains-power cable 24. A mobile functional unit 22 is arranged at the interface of the mains-power cable 24 of the hand-held power tool 14b to the mains energy supply system.

In a third embodiment, the mobile functional unit 22 is integrated in the hand-held power tool 14c (FIG. 1).

Figure 2:
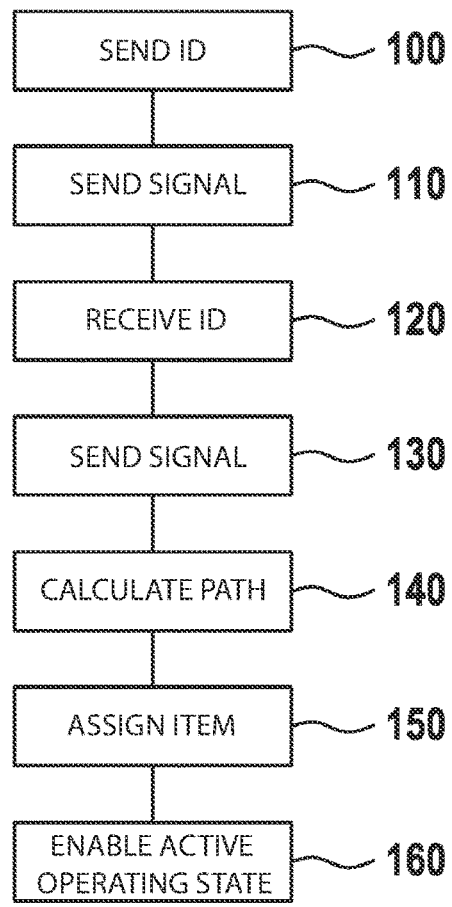
FIG. 2 a flow diagram of a first method for enabling an active operating state of a hand-held power tool in dependence on whether an item of protective equipment is carried or worn by an operator of the hand-held power tool, FIG. 3 a flow diagram of a second method for enabling an active operating state of a hand-held power tool in dependence on whether an item of protective equipment is carried or worn by an operator of the hand-held power tool.

FIG. 2 shows a method for the enabling of an active operating state of a hand-held power tool 14a, 14b, 14c by at least one infrastructure unit 12a in dependence on whether an item of protective equipment 16a is carried and/or worn by an operator of the hand-held power tool 14a, 14b, 14c.

In a first method step 100, the ID of the first protective equipment element 18a of the first item of protective equipment 16a is is sent to the first infrastructure unit 12a. The first infrastructure unit 12a receives the ID of the first protective equipment element 18a of the first item of protective equipment 16a. In a second method step 110, the first infrastructure unit 12a sends a first signal to the mobile functional unit 22 arranged on the hand-held power tool 14a, 14b, 14c.

In a further method step 120, the second infrastructure unit 12b receives the ID of the second protective equipment element 18b of the item of protective equipment 16b.

In the method step 130, the second infrastructure unit 12b sends a second signal to the mobile functional unit 22.

In the method step 140, the first infrastructure unit 12a and/or the second infrastructure unit 12b calculate/calculates, from the first signal and the second signal, a path travelled by the protective equipment element 18a, 18b of the item of protective equipment 16a, 16b. It is also conceivable, however, that a running time or a signal strength is calculated.

In the method step 150, the item of protective equipment 16a, 16b is assigned to the operator 21 wearing the item of protective equipment 16a, 16b and carrying the hand-held power tool 14a, 14b, 14c, on the basis of the path travelled.

In method step 160, enabling of an active operating state of the hand-held power tool 14a, 14b, 14c is effected in dependence on whether the item of protective equipment 16a, 16b is carried and/or worn by the operator 21. This is effected in that the infrastructure unit 12a, 12b sends a signal to the mobile functional unit 22, and the the mobile functional unit 22 activates an electrical energy supply for the hand-held power tool 14a, 14b, 14c.

In the method according to FIG. 2, more than one or two IDs may be sent to the first infrastructure unit 12a and/or the second infrastructure unit 12b.

Figure 3:
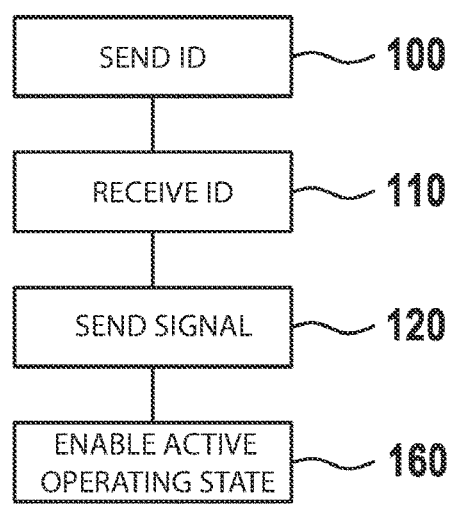

FIG. 3 shows a second method for the enabling of an active operating state of a hand-held power tool 14a, 14b, 14c by at least one infrastructure unit 12a.

In a first method step 100, the ID of the first protective equipment element 18a of the first item of protective equipment 16a and/or the ID of the second protective equipment element 18b of the second item of protective equipment 16b is sent to the first infrastructure unit 12a and/or to the second infrastructure unit 12b. In a second method step 110, the first infrastructure unit 12a and/or the second infrastructure unit 12b receive/receives the ID of a hand-held power tool 14a, 14b, 14c. In the method step 120, a signal is sent by the first infrastructure unit 12a and/or by the second infrastructure unit 12b to the mobile functional unit 22 integrated in the hand-held power tool 14a, 14b, 14c.

In method step 160, enabling of an active operating state of the hand-held power tool 14a, 14b, 14c is effected in dependence on whether the item of protective equipment 16a, 16b is carried and/or worn by the operator 21. This is effected in that the infrastructure unit 12a, 12b sends a signal to the mobile functional unit 22, and the the mobile functional unit 22 activates an electrical energy supply for the hand-held power tool 14a, 14b, 14c.

The invention claimed is:

1. A method for enabling at least one active operating state of a hand-held power tool by at least one infrastructure unit in dependence on whether an item of protective equipment is carried and/or worn by an operator of the hand-held power tool, the method comprising:
   sending at least one first ID of at least one first protective equipment element of a first item of protective equipment from the at least one first protective equipment element to at least one first infrastructure unit when the operator is in a territory in which the first infrastructure unit is located, the at least one first infrastructure unit being located externally with respect to and separately from the hand-held power tool and the first item of protective equipment;
   receiving the at least one first ID of the first protective equipment element of the first item of protective equipment with the at least one first infrastructure unit; and
   sending at least one first signal from the at least one first infrastructure unit to a mobile functional unit configured to control an active operating state of the hand-held power tool, wherein the mobile functional unit is integrated on or in the hand-held power tool.

2. The method as claimed in claim 1, further comprising:
   sending a second ID of at least one second protective equipment element of a second item of protective equipment from the at least one second protective element;

receiving the at least one ID of at least one second protective equipment element of a second item of protective equipment with at least one second infrastructure unit.

3. The method as claimed in claim 2, further comprising: sending at least one second signal to the mobile functional unit of the hand-held power tool from the at least one second infrastructure unit that is configured to control an active operating state of the hand-held power tool.

4. The method as claimed in claim 1, further comprising: calculating a path travelled by the at least one first protective equipment element of the first item of protective equipment from the at least one first signal with the at least one first infrastructure unit.

5. The method as claimed in claim 4, further comprising: assigning the first item of protective equipment to an operator of a hand-held power tool based on the calculated path travelled.

6. The method as claimed in claim 5, further comprising: enabling the at least one active operating state of the hand-held power tool in dependence on whether the first item of protective equipment is carried or worn by the operator of the hand-held power tool by sending the at least one first signal from the at least one first infrastructure unit to the mobile functional unit, and activating an electrical energy supply for the hand-held power tool with the mobile functional unit.

7. The method as claimed in claim 1, wherein the mobile functional unit is located at an interface to a rechargeable battery of the hand-held power tool.

8. The method as claimed in claim 1, wherein the mobile functional unit is located at the interface to a mains electrical power connection of the hand-held power tool.

9. The method as claimed in claim 1, wherein the mobile functional unit is located in the hand-held power tool.

10. A method for enabling at least one active operating state of a hand-held power tool by at least one infrastructure unit in dependence on whether an item of protective equipment is carried and/or worn by an operator of the hand-held power tool, the method comprising:
sending at least one ID of at least one first protective equipment element of a first item of protective equipment from the at least one first protective equipment element and/or at least one ID of at least one second protective equipment element of a second item of protective equipment from the at least one first protective equipment element to at least one first infrastructure unit and/or to at least one second infrastructure unit when the operator moves in a territory in which the first infrastructure unit and the second infrastructure unit is located, the at least one first infrastructure unit and the at least one second infrastructure unit being located separately from and externally with respect to the hand-held power tool;
sending at least one ID of at least one hand-held power tool to the at least one first infrastructure unit and/or the at least one second infrastructure unit; and
sending at least one first signal from the at least one first infrastructure unit and/or sending at least one second signal from the at least one second infrastructure unit to a mobile functional unit configured to control an active operating state of the hand-held power tool,
wherein the mobile functional unit is integrated on or in the hand-held power tool.

11. The method as claimed in claim 10, further comprising:
enabling the at least one active operating state of the hand-held power tool in dependence on whether the first item of protective equipment is carried or worn by the operator of the hand-held power tool by sending the at least one first signal from the at least one first infrastructure unit to the mobile functional unit, and activating an electrical energy supply for the hand-held power tool with the mobile functional unit.

12. A system, comprising:
at least one infrastructure unit;
at least one hand-held power tool; and
at least one item of protective equipment having at least one protective equipment element configured to communicate with the at least one infrastructure unit,
wherein the at least one infrastructure unit is configured at least to send a signal to a mobile functional unit in dependence on whether the at least one item of protective equipment is carried and/or worn by an operator,
wherein the at least one infrastructure unit is located in a territory separately from and externally with respect to the at least one hand-held power tool, and
wherein the mobile functional unit is configured to activate an electrical power supply for the at least one hand-held power tool in response to receiving the signal from the at least one infrastructure unit.

* * * * *